(12) United States Patent
Takahashi et al.

(10) Patent No.: US 9,013,090 B2
(45) Date of Patent: Apr. 21, 2015

(54) DRIVE DEVICE USING POLYMER ACTUATOR

(75) Inventors: Isao Takahashi, Miyagi-ken (JP); Hideo Kurokawa, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 296 days.

(21) Appl. No.: 13/607,521

(22) Filed: Sep. 7, 2012

(65) Prior Publication Data

US 2012/0326564 A1   Dec. 27, 2012

Related U.S. Application Data

(63) Continuation of application No. PCT/JP2011/055528, filed on Mar. 9, 2011.

(30) Foreign Application Priority Data

Mar. 16, 2010   (JP) ................................. 2010-059126

(51) Int. Cl.
*H01L 41/08*     (2006.01)
*F03G 7/00*      (2006.01)

(52) U.S. Cl.
CPC ............... *F03G 7/005* (2013.01); *Y10S 310/80* (2013.01)

(58) Field of Classification Search
USPC ......... 310/800, 328, 300, 330, 331, 332, 311, 310/363, 364, 365, 366
See application file for complete search history.

(56) References Cited

U.S. PATENT DOCUMENTS

| 4,664,632 | A  | * | 5/1987 | Tretiakoff et al. | ............ | 434/114 |
| 7,583,009 | B2 | * | 9/2009 | Nagai et al. | ................... | 310/328 |
| 7,733,000 | B2 | * | 6/2010 | Kudoh | ............................. | 310/332 |
| 8,237,324 | B2 | * | 8/2012 | Pei et al. | ....................... | 310/306 |
| 8,602,766 | B2 | * | 12/2013 | Muscroft | ....................... | 425/235 |
| 8,602,786 | B2 | * | 12/2013 | Takahashi et al. | ............ | 434/113 |

FOREIGN PATENT DOCUMENTS

| JP | 2008-147863 | 6/2008 |
| JP | 2009-5436   | 1/2009 |
| JP | 2009-77578  | 4/2009 |
| JP | 2010-39311  | 2/2010 |

OTHER PUBLICATIONS

International Search Report dated May 17, 2011 from International Application No. PCT/JP2011/055528.

* cited by examiner

*Primary Examiner* — Thomas Dougherty
*Assistant Examiner* — Karen B Addison
(74) *Attorney, Agent, or Firm* — Beyer Law Group LLP

(57) ABSTRACT

An actuator includes an electrolytic layer, a first electrode layer, and a second electrode layer. The electrolytic layer includes a polymer and an ionic liquid included in the polymer. When a voltage that makes the first electrode layer a positive side is applied, the actuator deforms to be in a drive state, thereby driving a protruding member. In a period other than a drive period in which the protruding member is driven, a reverse voltage that makes the first electrode layer a negative side is applied, thereby rectifying the tendency of the actuator to bow or the like.

19 Claims, 7 Drawing Sheets

DRIVE DEVICE USING POLYMER ACTUATOR

CLAIM OF PRIORITY

This application is a Continuation of International Application No. PCT/JP2011/055528 filed on Mar. 9, 2011, which claims benefit of Japanese Patent Application No. 2010-059126 filed on Mar. 16, 2010. The entire contents of each application noted above are hereby incorporated by reference.

BACKGROUND OF THE INVENTION

1. Field of the Invention

The present invention relates to a drive device using a polymer actuator formed of a polymer including an ionic liquid, and more particularly to a drive device capable of overcoming the tendency of the actuator to bow in a certain direction and preventing the ionic liquid from seeping out.

2. Description of the Related Art

As the structure of a polymer actuator of the related art, one having an electrolytic layer including an ionic liquid and a polymer, and electrode layers formed on two sides of the electrolytic layer is known. Application of a voltage across the electrode layers generates a stress difference between the surfaces of the two electrode layers due to migration and non-uniformity of distribution of ions in the polymer, resulting in the occurrence of bowing or deformation.

Japanese Unexamined Patent Application Publication Nos. 2009-77578 and 2009-5436 disclose methods of controlling a voltage applied to electrode layers of a polymer actuator.

In the method disclosed by Japanese Unexamined Patent Application Publication No. 2009-77578, a high-frequency inverted voltage is intermittently applied in a drive period in which a drive voltage is applied to the polymer actuator. Accordingly, unnecessary electrolysis of positive ions is suppressed, thereby improving the endurance.

In the method disclosed by Japanese Unexamined Patent Application Publication No. 2009-5436, a drive voltage is intermittently applied in a drive period in which the polymer actuator is driven, thereby suppressing a deformation backtrack phenomenon.

In a drive device for activating a driven member such as a protruding member with the use of bowing or deformation of the polymer actuator in a certain direction, the polymer actuator tends to deform in a protruding direction. On the surface that becomes convex upon bowing or deformation, the ionic liquid tends to be non-uniformly distributed and to seep out.

In both of Japanese Unexamined Patent Application Publication Nos. 2009-77578 and 2009-5436, the applied voltage is changed only in the drive period in which the polymer actuator is deformed. Even when such control of changing the applied voltage in the drive period is applied to the drive device for activating the driven member with the use of bowing or deformation in the certain direction, the tendency of the polymer actuator to deform in a driving direction may not be sufficiently overcome.

SUMMARY OF THE INVENTION

The present invention provides a drive device using a polymer actuator, the drive device being capable of rectifying deformation tendency in a driving direction and more easily preventing an ionic liquid from seeping out.

According to an aspect of the invention, there is provided a drive device including a polymer actuator formed of a polymer including an ionic liquid. The polymer actuator includes an electrode layer stacked on a first surface and an electrode layer stacked on a second surface. The polymer actuator is partially fixed. The polymer actuator activates a driven member when a drive voltage is applied across the electrode layers and the polymer actuator bows and deforms in a direction in which the first surface becomes concave. A reverse voltage in a direction opposite to that of the drive voltage is applied across the electrode layers in a period other than a drive period in which the driven member is activated.

In the drive device according to the aspect of the invention, the driven member is driven by bowing or deformation of the polymer actuator in a certain direction. Application of the reverse voltage, which is in a direction opposite to a driving direction, to the polymer actuator facilitates prevention of the tendency of bowing in the driving direction and prevention of the non-uniformity of distribution of the ionic liquid.

For example, the driven member may be a protruding member, and a free end of the polymer actuator may cause the protruding member to protrude from the surface of a housing.

A device in which plural protruding members are caused to protrude from the surface of the housing is used as a dot display device such as a Braille cell.

Note that the drive device according to the aspect of the invention may also be used, in a mobile device or the like, as an operation device in which a contact operation part or an operation button is caused to protrude from the surface of the housing, a display device that is temporarily caused to protrude from the surface of the housing, or a mode switching device that switches an operation mechanism.

For example, when power is turned ON, a rectification period may be set in which the reverse voltage is applied to cause the polymer actuator to bow in a direction in which the second surface becomes concave. Alternatively, after an operation of pressing out the driven member is completed, a rectification period may be set in which the reverse voltage is applied to cause the polymer actuator to bow in a direction in which the second surface becomes concave.

In this case, it is preferable that the rectification period be set in accordance with the length of the drive period. Alternatively, it is preferable that the rectification period be set in accordance with an accumulated time of the drive period.

For example, the rectification period is set to the same time as the drive period or set to the same time as or longer than the accumulated drive time.

The reverse voltage with a certain magnitude may be continuously applied across the electrode layers in the rectification period.

Alternatively, the reverse voltage with a certain magnitude may be intermittently applied across the electrode layers in the rectification period. Alternatively, the magnitude of the reverse voltage applied across the electrode layers may be changed in the rectification period. Further, the reverse voltage may be applied, and a voltage in the same direction as that of the drive voltage may be temporarily applied in the rectification period.

The tendency to bow in the driving direction may be rectified by causing the polymer actuator to bow and deform in a direction opposite to the driving direction in a period in which the protruding member is not driven.

When the polymer actuator is heated in the rectification period, the bowing tendency may be efficiently rectified.

According to the aspect of the invention, the reverse voltage whose absolute value is greater than or equal to that of a rated voltage may be applied for a short time in a period other than the drive period.

Application of the reverse voltage whose absolute value is greater than or equal to that of the rated voltage for a short time, as has been described above, facilitates suppression of the non-uniformity of distribution of the ionic liquid in the polymer actuator and suppression of seeping out of the ionic liquid.

It is preferable that a time in which the reverse voltage is applied be changed in accordance with the current feeding capability of a power supply provided in a device.

For example, when the current feeding capability of the power supply is reduced, the time in which the reverse voltage is applied may be shortened, or the number of times the reverse voltage is applied may be made fewer. Accordingly, the power consumption may be suppressed.

A process of applying the reverse voltage is preferably performed in a period in which a battery provided in a device is being charged.

In particular, a process of intermittently applying the reverse voltage whose absolute value is greater than that of the rated voltage for a short time is preferably performed in a battery charging time, regarding the point that the battery power consumption may be suppressed.

The drive device according to the aspect of the invention facilitates rectification of the tendency of the polymer actuator to bow in the driving direction, and prevention of the non-uniformity of distribution of the ionic liquid in the polymer and seeping out of the ionic liquid.

DESCRIPTION OF THE PREFERRED EMBODIMENTS

Figure 1:
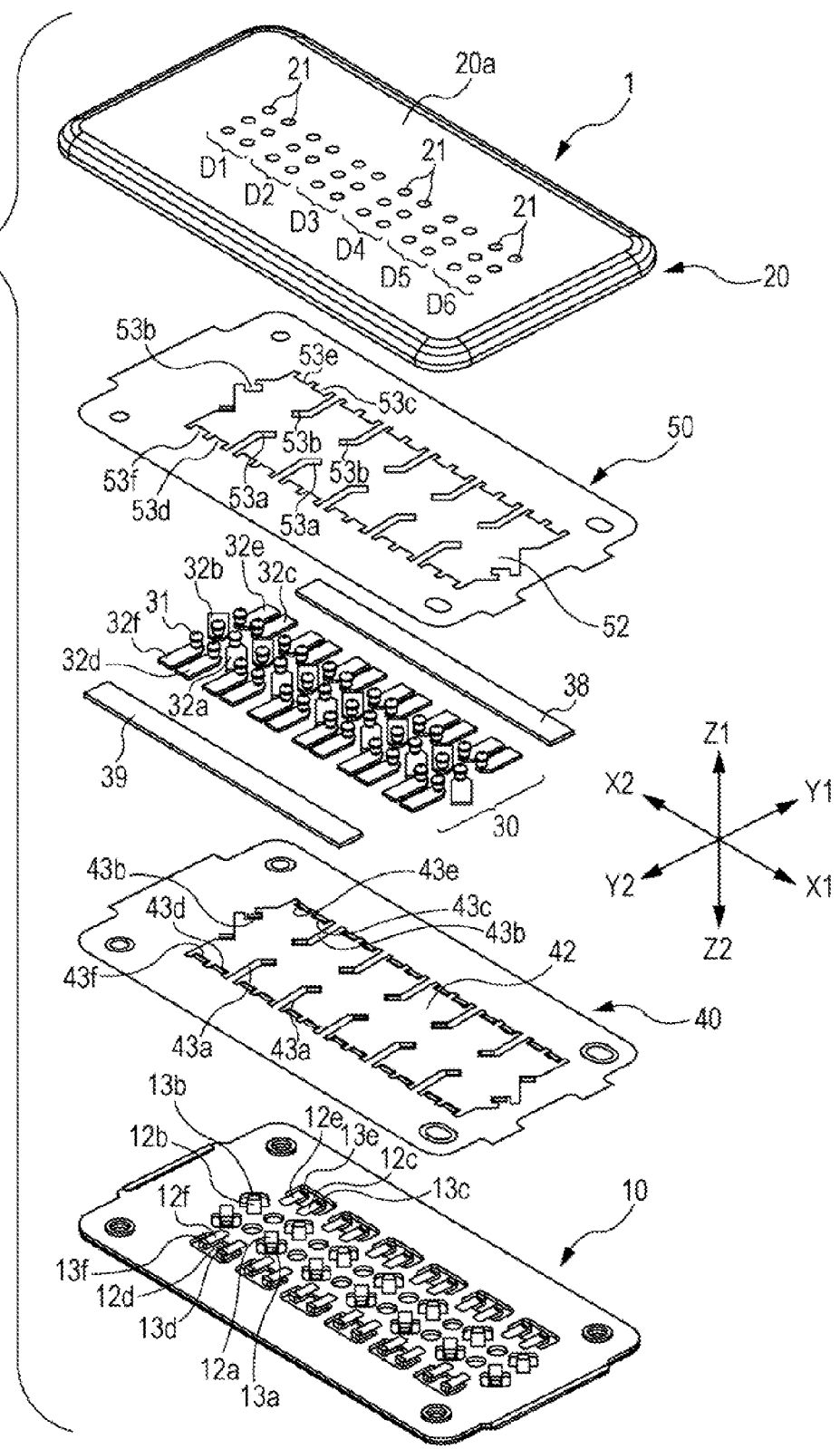
FIG. 1 is an exploded perspective view of a dot display device as an embodiment of a drive device using a polymer actuator.

FIG. 1 illustrates a dot display device 1 as an embodiment of a polymer actuator drive device according to an embodiment of the present invention. The dot display device 1 is used as a Braille cell that gives information to visually impaired people.

Referring to FIG. 1, the dot display device 1 includes a lower case 10 and an upper case 20, which are superposed on each other to form a thin housing. A dot drive unit 30 is placed at a center portion in the thickness direction of the housing. The dot drive unit 30 is sandwiched between a lower wiring board 40 and an upper wiring board 50 and is accommodated in the housing. The lower case 10 and the upper case 20 are both formed of a plastic material and are fixed to each other with plural fixing screws.

Figure 2:
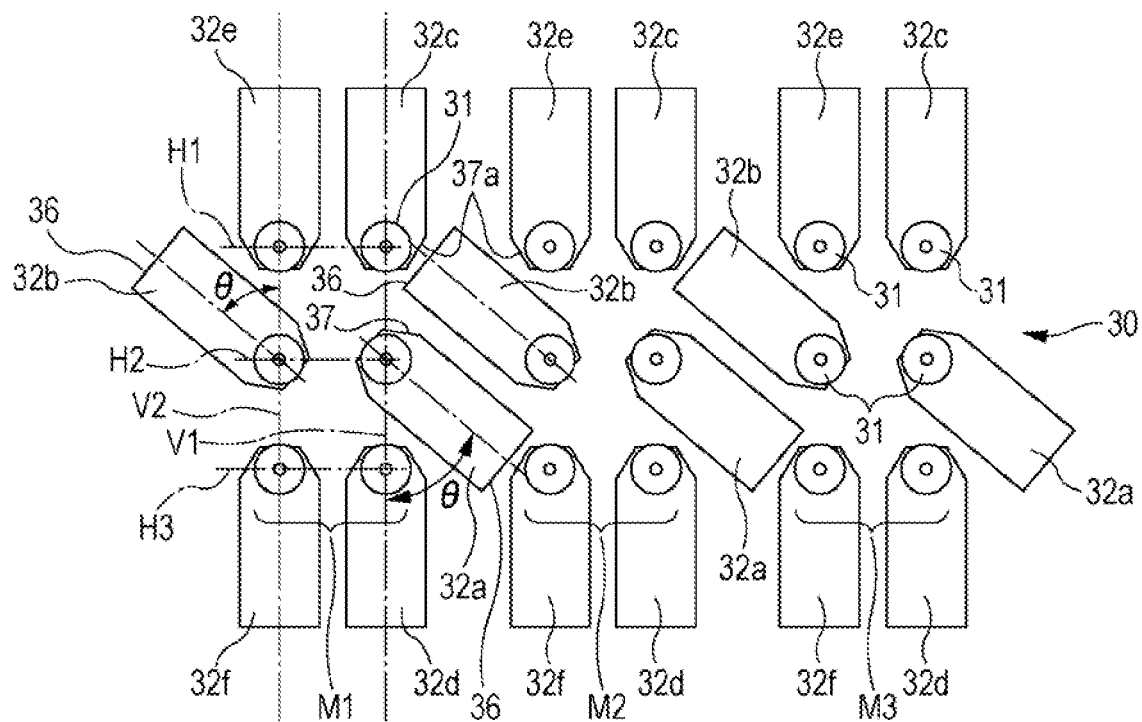
FIG. 2 is a plan view illustrating the arrangement of plural protruding members and polymer actuators.
Figure 2:
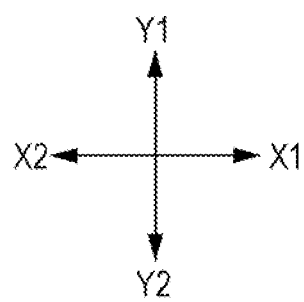

Referring now to FIG. 2, the dot drive unit 30 includes plural protruding members 31, which are driven members.

Figure 3:
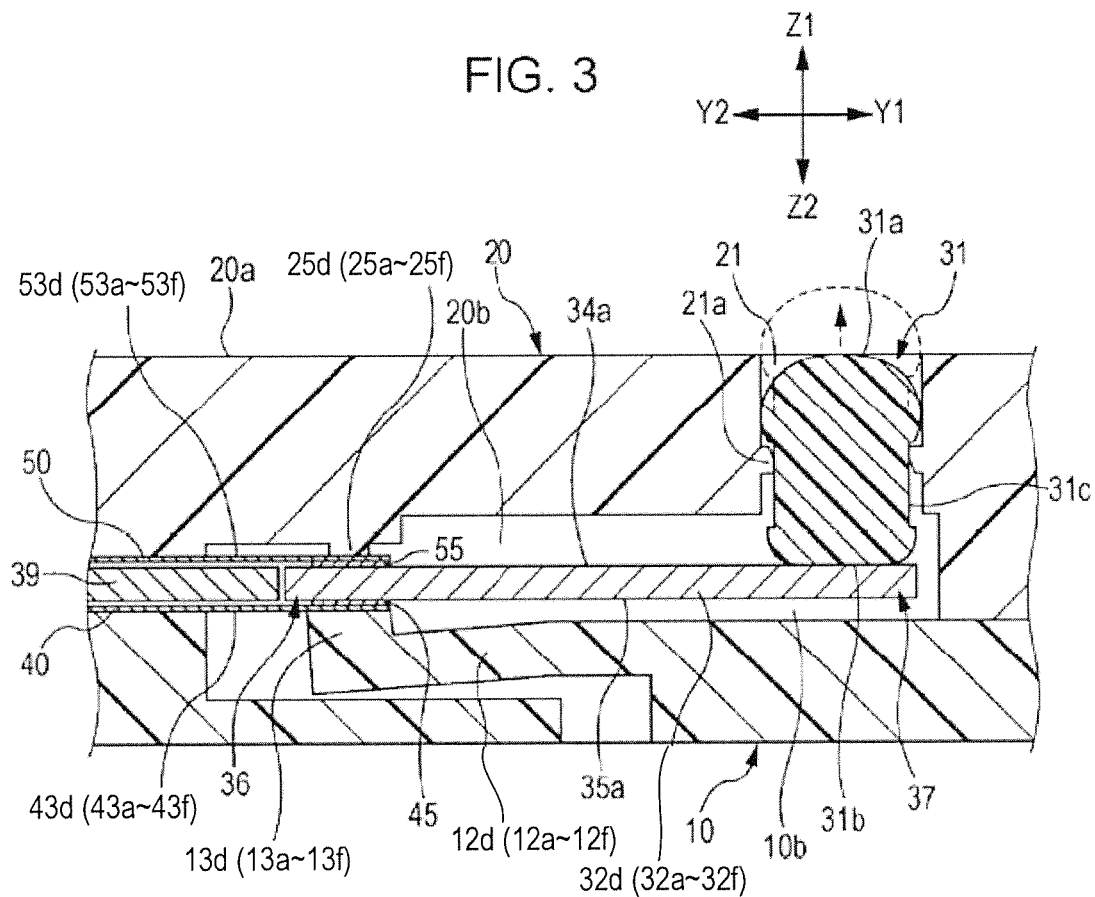
FIG. 3 is a sectional view of a portion of the dot display device.

The protruding members 31 are formed of a plastic material. Referring now to FIG. 3, the protruding members 31 each have a contact part 31a whose leading end is curved and faces a Z1 direction, which is the protruding direction, and a pressed part 31b whose base end faces a Z2 direction, which is a regressive direction, and receives a protruding thrust. A fitting recess 31c, having a certain width in the Z1-Z2 direction, is formed in an intermediate portion of the girth of each of the protruding members 31.

Referring back to FIG. 1, the upper case 20 has plural holes 21 penetrating therethrough in a vertical direction. Referring now to FIG. 3, the holes 21 formed in the upper case 20 each have a diameter allowing a corresponding one of the protruding members 21 to move in the Z1-Z2 direction. At intermediate portions in the Z1-Z2 direction of the holes 21, ring-shaped support ribs 21a are integrally formed, protruding inward from the inner peripheral surface. When the protruding members 31 are thrust from inside the upper case 20 into the holes 21 in the Z1 direction, the fitting recesses 31c and the support ribs 21a engage with each other, securing the protruding members 31 not to fall off from the holes 21. The protruding members 31 are capable of moving in the Z1-Z2 direction in the holes 21 within the range of the width of the fitting recesses 31c.

Referring back to FIG. 1, the surface of the upper case 20 is a contact face 20a that a finger may touch. Six of the holes 21 are grouped as a combination, and the holes 21 open on the contact face 20a. Six holes 21 constitute a first display part D1. Similarly, six holes 21 constitute a second display part D2. Similarly, six holes 21 constitute a third display part D3, a fourth display part D4, a fifth display part D5, and a sixth display part D6.

Referring now to FIG. 2, in the dot drive unit 30, six protruding members 31 constitute a first dot matrix M1. The protruding members 31 constituting the first dot matrix M1 are inserted into the corresponding holes 21 of the first display part D1. Similarly, six protruding members 31 constituting a second dot matrix M2 are inserted into the six holes 21 of the second display part D2. Similarly, protruding members 31 constituting each of a third dot matrix M3, a fourth dot matrix M4, a fifth dot matrix D5, and a sixth dot matrix M6 are inserted into the six holes 21 of each of the third display part D3, the fourth display part D4, the fifth display part D5, and the sixth display part D6.

A pair of dot matrices display one Braille character. Braille character information of six characters is obtained by sliding a finger on the contact face 20a of the upper case 20 in the X1 direction.

With continued reference to FIG. 2, three protruding members 31 are arranged in each of a first column V1 and a second column V2 extending in the Y1-Y2 direction in the first dot matrix M1. Thus, two protruding members 31 are arranged in each of rows H1, H2, and H3 in the X1-X2 direction. Accordingly, the first dot matrix M1 has six protruding members 31. The arrangement of the protruding members 31 in the columns V1 and V2 is at an equal pitch. Also, the arrangement of the protruding members 31 in the rows H1, H2, and H3 is at an equal pitch. The arrangement pitch in the columns is the same as the arrangement pitch in the rows. The arrangement of protruding members 31 is the same in the second dot matrix M2, the third dot matrix M3, and so forth.

With continued reference to FIG. 2, actuators 32 are provided with a one-to-one corresponding relationship with six protruding members 31 in each of the dot matrices M1, M2, M3, and so forth. Although the actuators 32 are given different reference numerals, namely, 32a, 32b, 32c, 32d, 32e, and 32f, so as to be distinguishable from one another, all the actuators 32 have the same structure, shape, and size.

Figure 4:
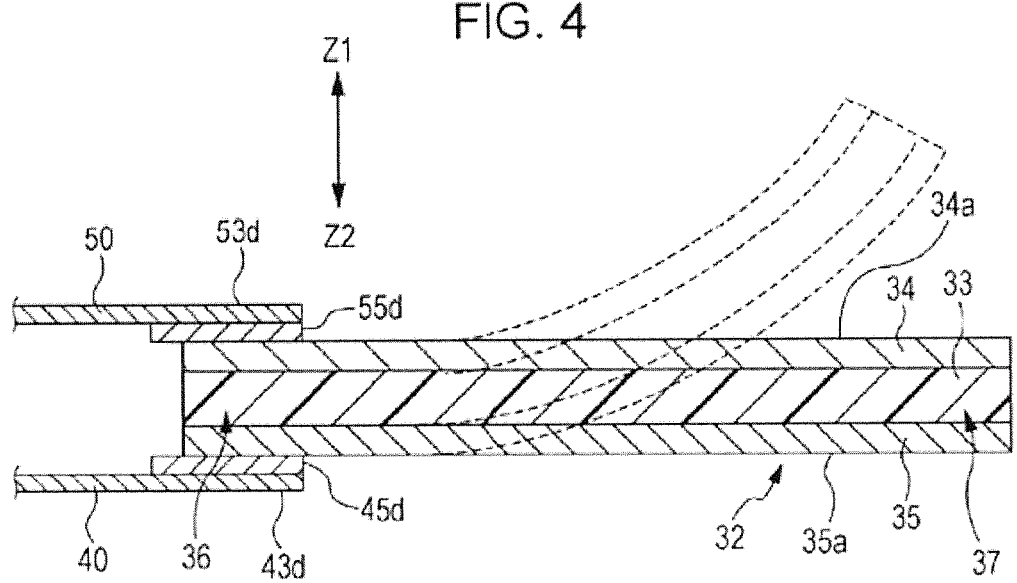
FIG. 4 is a diagram illustrating the structure and operation of a polymer actuator.

FIG. 4 illustrates a cross-section of the structure of one actuator 32. The actuator 32 is a polymer actuator and includes a plate-shaped electrolytic layer 33, a first electrode layer 34 stacked on the Z1 side of the electrolytic layer 33, and a second electrode layer 35 stacked on the Z2 side of the electrolytic layer 33. The electrolytic layer 33 is configured by including an ionic liquid (electrolytic liquid) in a polymer, such as polyvinylidene fluoride (PVDF) or polymethyl methacrylate (PMMA). The first electrode layer 34 and the second electrode layer 35 include an ionic liquid in the polymer and further include a conductive filler. The conductive filler includes a carbon material such as a carbon nanotube.

In the actuator 32, a plate surface 34a of the first electrode layer 34 appears on the Z1-side surface, and a plate surface 35a of the second electrode layer 35 appears on the Z2-side surface. The actuator 32 has a plate shape in which the length and the width of the plate surface 34a and the plate surface 35a are sufficiently greater than the thickness of the plate surface 34a and the plate surface 35a.

For example, when positive ions included in the electrolytic layer 33 are greater than negative ions, application of a potential difference between the first electrode layer 34 and the second electrode layer 35 causes the first electrode layer 34 to be a positive side. This causes the positive ions to be distributed non-uniformly in the second electrode layer 35, resulting in greater swelling of the second electrode layer 35. At this time, as illustrated in FIG. 4, the actuator 32 bows and deforms so that the Z1 side becomes concave. A base end 36 of each of the actuators 32 is fixed, and a leading end 37, which is a free end, of each of the actuators 32 faces the pressed part 31b of a corresponding one of the protruding members 31. When the actuator 32 bows, as indicated by broken lines in FIG. 4, the leading end 37 lifts the protruding member 31, and, as illustrated by broken lines in FIG. 3, the contact part 31a of the protruding member 31 protrudes, in the Z1 direction, from the contact face 20a of the upper case 20.

FIG. 2 illustrates the classification and arrangement of six actuators 32 in the first dot matrix M1. The same applies to the other dot matrices M2, M3, and so forth.

As illustrated in FIG. 2, the first intermediate actuator 32a faces the protruding member 31 positioned in the middle of the first column V1. The second intermediate actuator 32b faces the protruding member 31 positioned in the middle of the second column V2. The first end actuator 32c faces the protruding member 31 positioned at a Y1-side end of the first column V1. The second end actuator 32d faces the protruding member 31 positioned at a Y2-side end of the first column V1. The third end actuator 32e faces the protruding member 31 positioned at a Y1-side end of the second column V2. The fourth end actuator 32f faces the protruding member 31 positioned at a Y2-side end of the second column V2.

With continued reference to FIG. 2, the centerline extending from the base end 36 to the leading end 37 of the first intermediate actuator 32a diagonally extends at an angle θ, which is greater than 0 degrees and less than 90 degrees, with respect to the first column V1. The base end 36 of the first intermediate actuator 32a protrudes toward the X1 side, farther than X1-side lateral lines of the first end actuator 32c and the second end actuator 32d. Similarly, the centerline of the second intermediate actuator 32b is tilted at the angle θ with respect to the second column V2. The base end 36 of the second intermediate actuator 32b protrudes toward the X2 side, farther than X2-side lateral lines of the third end actuator 32e and the fourth end actuator 32f.

In adjacent dot matrices, the first intermediate actuator 32a and the second intermediate actuator 32b are arranged side by side in the Y direction.

The upper wiring board 50 illustrated in FIG. 1 is a flexible board with a plastic film as a base. A long notch 52 is formed in the X direction at a center part of the upper wiring board 50. A first intermediate contact part 53a and a second intermediate contact part 53b are formed, which integrally extend toward the interior of the notch 52. The first intermediate contact part 53a and the second intermediate contact part 53b are formed at an interval in the X direction. In the upper wiring board 50, a first end contact part 53c and a third end contact part 53e are formed, protruding from a Y1-side edge of the notch 52 toward the notch 52. Similarly, a second end contact part 53d and a fourth end contact part 53f are formed at a Y2-side edge of the notch 52.

Referring now to FIG. 3, an electrode part 55 is provided below (Z2 side) a tip portion of each of the contact parts 53a, 53b, 53c, 53d, 53e, and 53f of the upper wiring board 50. A lead wire connected to each electrode part 55 is patterned and formed on the lower face of the upper wiring board 50.

The lower wiring board 40 illustrated in FIG. 1 is a flexible board formed of a plastic film. The lower wiring board 40 has a structure that is vertically (Z1-Z2 direction) symmetrical to the upper wiring board 50. A notch 42 is formed at a center part of the lower wiring board 40. A first intermediate contact part 43a and a second intermediate contact part 43b integrally extend from the lower wiring board 40 toward the interior of the notch 42. A first end contact part 43c and a third end contact part 43e are formed at the Y1 side of the notch 42. A second end contact part 43d and a fourth end contact part 43f are formed at the Y2 side of the notch 42.

Referring again to FIG. 3, an electrode part 45 is provided below (Z2 side) a tip portion of each of the intermediate contact parts 43a and 43b and the end contact parts 43c, 43d, 43e, and 43f of the lower wiring board 40. A lead wire connected to each electrode part 45 is patterned and formed on the upper face of the lower wiring board 40.

Referring back to FIG. 1, elastic parts 12a, 12b, 12c, 12d, 12e, and 12f are formed on the lower case 10, and these six elastic parts 12a, 12b, 12c, 12d, 12e, and 12f are arranged in each of the display parts D1, D2, and so forth. A base end of each of the elastic parts 12a, 12b, 12c, 12d, 12e, and 12f is integrated with the lower case 10, and a free end of each of the elastic parts 12a, 12b, 12c, 12d, 12e, and 12f is elastic and deformable in the vertical (Z1-Z2) direction. Lower pressing parts 13a, 13b, 13c, 13d, 13e, and 13f are integrated, facing upward, with the free ends of the elastic parts 12a, 12b, 12c, 12d, 12e, and 12f, respectively.

On the lower face of the upper case 20, upper pressing parts 25a, 25b, 25c, 25d, 25e, and 25f are integrally formed, protruding downward. The upper pressing parts 25a, 25b, 25c, 25d, 25e, and 25f correspond to the lower pressing parts 12a, 12b, 12c, 12d, 12e, and 12f, respectively, of the lower case 10. Among these upper pressing parts 25a, 25b, 25c, 25d, 25e, and 25f, one upper pressing part 25d is illustrated in FIG. 3.

In the assembly of the dot display device 1, at first, all the protruding members 31 are inserted into the holes 21 of the upper case 20.

Thereafter, the actuators 32a, 32b, 32c, 32d, 32e, and 32f constituting the dot drive unit 30 and positioning members 38 and 39 positioned on both sides of the actuators 32a, 32b, 32c, 32d, 32e, and 32f are sandwiched between the lower wiring board 40 and the upper wiring board 50. Further, this assembly is sandwiched between the lower case 10 and the upper case 20. The lower case 10 and the upper case 20 are fixed at multiple positions with fixing screws.

With continued reference to FIG. 3, when the assembly is completed, the base end 36 of the second end actuator 32d is sandwiched between the electrode part 45 at a tip portion of the second end contact part 43d of the lower wiring board 40 and the electrode part 55 at a tip portion of the second end contact part 53d of the upper wiring board 50. Further, this is sandwiched between the lower pressing part 13d at a tip portion of the elastic part 12d of the lower case 10 and the upper pressing part 25d of the upper case 20. The base end 36 of the second end actuator 32d and the electrode parts 45 and 55 positioned above and below the base end 36 receive elastic force of the elastic part 12d and are held in a stable manner by the lower pressing part 13d and the upper pressing part 25d.

With continued reference to FIG. 3, the base end 36 of the second end actuator 32d is held, and the leading end 37, which is a free end, of the second end actuator 32d contacts the pressed part 31b of the protruding member 31. Inside the lower case 10 and the upper case 20, there are an upper space 20b in which the second end actuator 32d whose base end 36 is held is capable of bowing and deforming in the upward direction (Z1 direction), and a lower space 10b in which the second end actuator 32d is capable of bowing and deforming in the downward direction (Z2 direction).

The holding structure of the other actuators 32 is the same as that of the second end actuator 32d illustrated in FIG. 3.

That is, the base end 36 of the first intermediate actuator 32a is sandwiched between the electrode part 45 provided at the first intermediate contact part 43a of the lower wiring board 40 and the electrode part 55 provided at the first intermediate contact part 53a of the upper wiring board 50. Further, this is sandwiched and held between the lower pressing part 13a of the lower case 10 and the upper pressing part 25a of the upper case 20. The leading end 37 of the first intermediate actuator 32a contacts the pressed part 31b of the protruding member 31. The first intermediate actuator 32a is capable of bowing and deforming upward and downward inside the lower case 10 and the upper case 20.

The base end 36 of the second intermediate actuator 32b is sandwiched between the electrode part 45 provided at the second intermediate contact part 43b of the lower wiring board 40 and the electrode part 55 provided at the second intermediate contact part 53b of the upper wiring board 50. Further, this is sandwiched between the lower pressing part 13a of the lower case 10 and the upper pressing part 25a of the upper case 20. Similarly, the first end actuator 32c, the third end actuator 32e, and the fourth end actuator 32f are sandwiched between the electrode parts 45 provided at the end contact parts 43c, 43e, and 43f of the lower wiring board 40 and the electrode parts 55 provided at the end contact parts 53c, 53e, and 53f, respectively, of the upper wiring board 50. Further, these are sandwiched between the lower pressing parts 13c, 13e, and 13f of the lower case 10 and the upper pressing parts 25b, 25e, and 25f, respectively, of the upper case 20.

Figure 5:
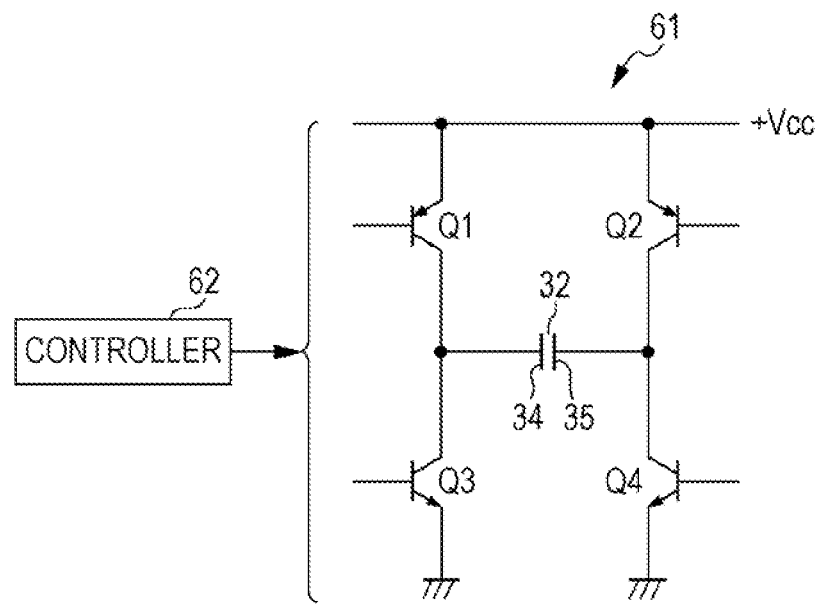
FIG. 5 is a diagram of a drive circuit.

FIG. 5 illustrates a power supply circuit 61 that applies a voltage to each of the actuators 32. The power supply circuit 61 is an H-bridge and has four active elements Q1, Q2, Q3, an Q4 performing a switch operation. A controller 62 selects and switches the four active elements Q1, Q2, Q3, an Q4, thereby applying a voltage to the first electrode layer 34 and the second electrode layer 35 of the actuator 32. The power supply circuit 61 is individually provided in each of the actuators 32.

The operation of the above-described dot display device 1 selects at least one of the protruding members 31 constituting the first dot matrix M1, which are positioned at the holes 21 of the display part D1 illustrated in FIG. 1, and causes the protruding member(s) 31 to protrude. This control is performed by selecting at least one of the six actuators 32a, 32b, 32c, 32d, 32e, and 32f positioned in the first dot matrix M1, and causing electricity to flow therethrough. As illustrated in FIG. 4, a voltage is applied across the first electrode layer 34 and the second electrode layer 35 of each selected actuator 32, thereby causing the first electrode layer 34 side to have a positive potential. This causes positive ions to migrate toward the second electrode layer 35 side, and the second electrode layer 35 side swells, resulting in bowing and deforming of the actuator 32 in a direction indicated by broken lines. With this bowing force, the protruding member 31 protrudes from the contact face 20a of the upper case 20. One or some of the six dots of the display part D1 is/are caused to protrude, thereby representing one Braille character.

Similarly, one Braille character is displayed by driving the second dot matrix M2 positioned at the second display part D2. The same operation is performed in the display parts D3, D4, D5, and D6. By sliding a finger on the contact face 20a in, for example, the X1 direction, information of six Braille characters can be obtained. After the Braille character information is read up to the display part D6, display is switched, and new Braille character information is displayed in the display parts D1 to D6. Again, a finger slides on the contact face 20a in the X1 direction. This whole operation is repeated, thereby enabling visually impaired people or the like to read long Braille character information.

Figure 6:
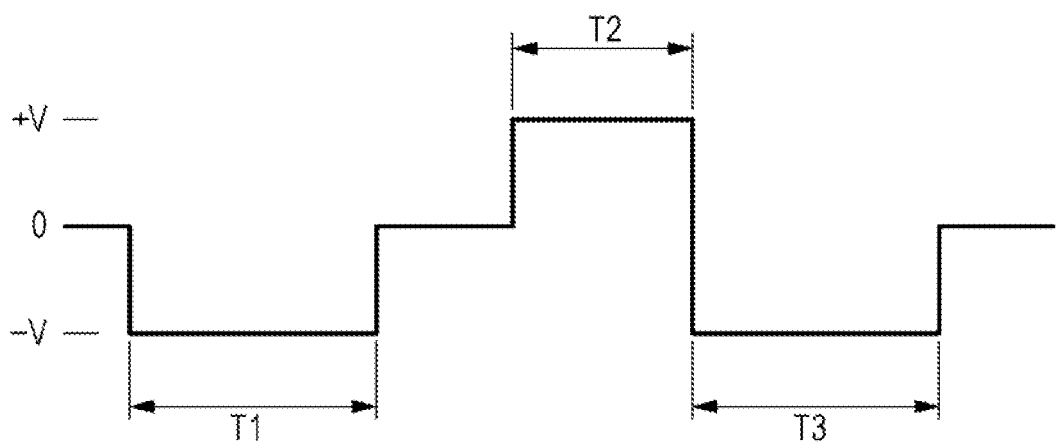
FIG. 6 is a diagram of polymer actuator driving control.

FIG. 6 and onward illustrate control examples of application of voltage to the actuators 32. In FIG. 6 and onward, "+V" denotes application of a drive voltage that gives a positive potential to the first electrode layer 34 and a negative potential to the second electrode layer 35; and "−V" denotes application of a reverse voltage that gives a negative potential to the first electrode layer 34 and a positive potential to the second electrode layer 35.

In a control example illustrated in FIG. 6, a first rectification period T1 is set before the operation of the dot display device 1 starts after the power is turned ON. In the first rectification period T1, the controller 62 controls all the power supply circuits 61, and the reverse voltage "−V" is applied to all the actuators 32. Each of the actuators 32 bows and deforms in a direction in which the plate surface 35a of the second electrode layer 35 becomes concave in a direction opposite to the direction indicated by broken lines in FIG. 4. At this time, the leading end 37 of each of the actuators 32 becomes separated from a corresponding one of the protruding members 31 and displaced toward the lower case 10.

Referring to FIG. 6, the drive voltage "+V" is applied to the selected actuator(s) 32 after the first rectification period T1. This drive period is denoted as T2. In the drive period T2, as illustrated in FIG. 4, each selected actuator 32 bows and deforms in a direction in which the plate surface 34a of the first electrode layer 34 becomes concave. The leading end 37 of the actuator 32 presses a corresponding one of the protruding members 31, and the contact part 31a of the protruding member 31 protrudes from the contact face 20a of the upper case 20. After the drive period T2 elapses, a second rectification period T3 is set. The reverse voltage "−V" is applied to the actuators 32, and the actuators 32 are deformed so that their leading ends 37 face the Z2 direction.

As illustrated in FIG. 6, the end of the drive period T2 continues to the second rectification period T3. Alternatively, after the drive period T2 elapses, a period shorter than the drive period T2 may be set, and then the second rectification period T3 may start.

The tendency of the polymer constituting the actuators 32 to bow toward the driving direction can be rectified by setting the first rectification period T1 immediately after the power ON and causing the actuators 32 to deform in a direction opposite to the driving direction. By setting the first rectification period T1 for all the actuators 32, even if not-driven protruding members 32 protrude from the contact face 20a of the upper case 20, this protrusion can be rectified.

By setting the second rectification period T3 after the drive period T2, if the tendency to bow toward the driving direction occurs in the drive period T2, as indicated by broken lines in FIG. 4, this can be immediately eliminated.

Here, the tendency to bow means two cases: one case is that residual mechanical bowing stress is left in the polymer constituting the actuators 32; and the other case is that non-uniformity of distribution of positive ions and negative ions between the first electrode layer 34 and the second electrode layer 35 is not overcome, and, due to this non-uniformity of distribution of ions, stress is left inside.

The residual mechanical stress left in the polymer can be reduced or removed by applying the reverse voltage "−V" in the rectification periods T1 and T3 and forcing the polymer to bow and deform in a direction opposite to that in the driving period T2. The non-uniformity of distribution of the ionic liquid inside the actuators 32 can be overcome by applying the reverse voltage "−V", which is opposite to that applied in the drive period T2. In addition, the problem of the ionic liquid seeping out to the surface of the actuators 32, which are convex, can also be overcome.

It is preferable that the first rectification period T1 and the second rectification period T3 illustrated in FIG. 6 be set in accordance with the length of the drive period T2. If the drive period T2 becomes long, elongating the rectification period T3 helps overcoming the tendency to bow toward the driving direction, thereby preventing not-driven protruding members 31 from protruding from the contact face 20a. It is preferable that the rectification period T3 be the same as or longer than the drive period T2 immediately before the rectification period T3.

The first rectification period T1 is set in accordance with a so-called activation time from when the power is turned ON to when the overall device becomes ready to operate. The first rectification period T1 is set to, for example, about a few milliseconds to a few seconds.

Referring back to FIG. 2, in a device where the plural protruding members 31 provided in the dot matrices are selectively driven by the actuators 32, while one or some of the actuators 32 is/are driven, the other actuators 32 are not driven in many cases. In such a case, the following control is possible in which, in the drive period T2 in which one or some of the actuators 32 is/are driven, the rectification period T3 is set for actuators 32 that are not operating, and the reverse voltage "−V" is applied to these actuators 32. On an actuator-by-actuator basis, the drive period T2 and the rectification period T3 are integrated, and, preferably, the length of the rectification period T3 is adjusted so that the disproportion between the drive period T2 and the rectification period T3 does not occur, that is, either the drive period T2 or the rectification period T3 does not become extremely long.

Figure 7:
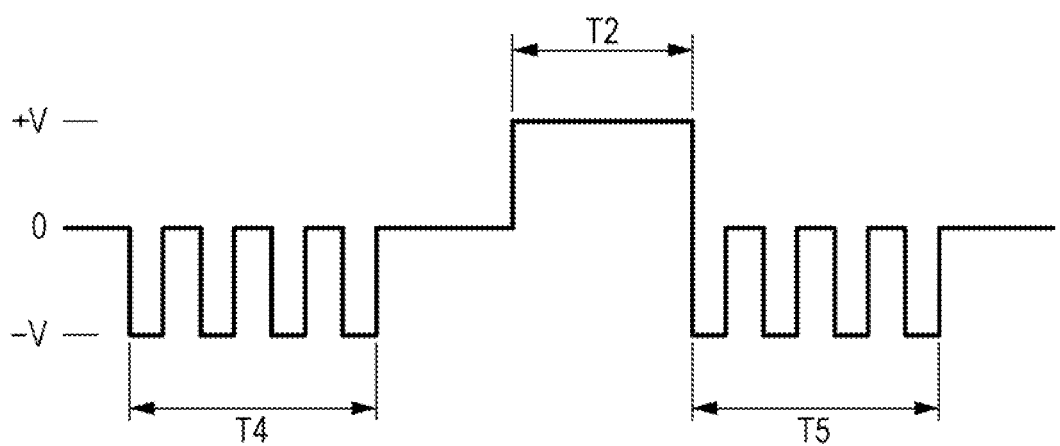
FIG. 7 is a diagram of polymer actuator driving control.

In a control example illustrated in FIG. 7, the reverse voltage "−V" is intermittently applied to the actuators 32 for a short time at intervals in a first rectification period T4 after the power ON and a second rectification period T5 set immediately after the drive period T2. In this control example, a voltage can be intermittently applied to the interior of the electrolytic layer 33 of each of the actuators 32 in the rectification periods T4 and T5, thereby preventing non-uniformity of distribution of ions and causing ions to be uniformly distributed. In this case, it is also preferable that the length of each of the rectification periods T4 and T5 be set in accordance with the drive period T2. For example, when the drive period T2 becomes long, the rectification periods T4 and T5 are set to be long. At this time, the rectification period T5 may be set to have the same length as the drive period T2, or may be set to be longer than the drive period T2. Further, it is preferable to set an accumulated time of applying the pulse-shaped reverse voltage "−V" in each of the rectification periods T4 and T5 (accumulated time of the pulse length of the reverse voltage) in accordance with the drive period T2.

Figure 8:
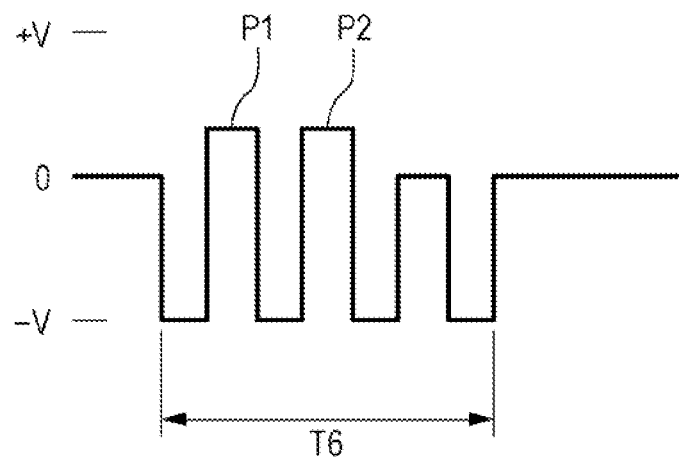
FIG. 8 is a diagram of polymer actuator driving control.

In a control example illustrated in FIG. 8, a rectification period T6 is set when the power is turned ON and immediately after the drive period T2. In the rectification period T6, the pulse-shaped reverse voltage "−V" is intermittently applied at intervals to the actuators 32. In periods P1 and P2 in a period in which the pulse-shaped reverse voltage "−V" is stopped, a voltage with the same polarity as the drive voltage "+V" is applied. Although the magnitude of the voltage in the periods P1 and P2 may be the same as the drive voltage "+V" in the drive period T2, the voltage in the periods P1 and P2 is preferably lower than the drive voltage "+V". Alternatively, the same voltage as that in the periods P1 and P2 may be applied in the entire period in which the pulses of the drive voltage "+V" are stopped.

In the control example illustrated in FIG. 8, the polarity of a potential difference affecting the electrolytic layer 33 can be alternated in the rectification period T6. This facilitates uniform distribution of not-uniformly distributed ions.

Figure 9:
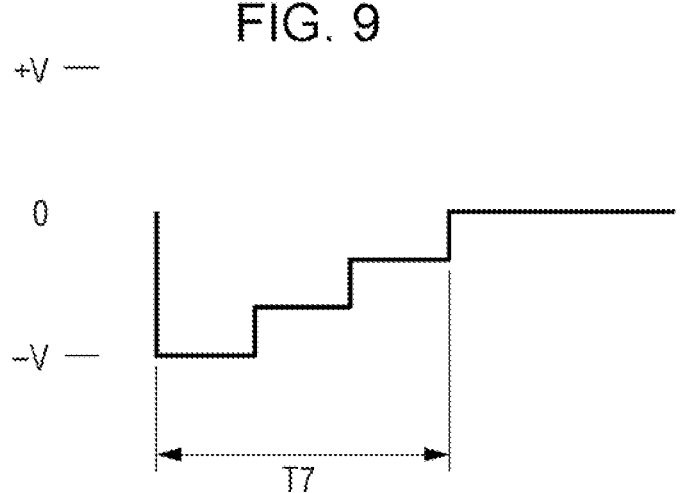
FIG. 9 is a diagram of polymer actuator driving control.

In a control example illustrated in FIG. 9, a rectification period T7 is set when the power is turned ON and immediately after the drive period T2. In the rectification period T7, the magnitude of the reverse voltage "−V" is changed step by step.

Figure 10:
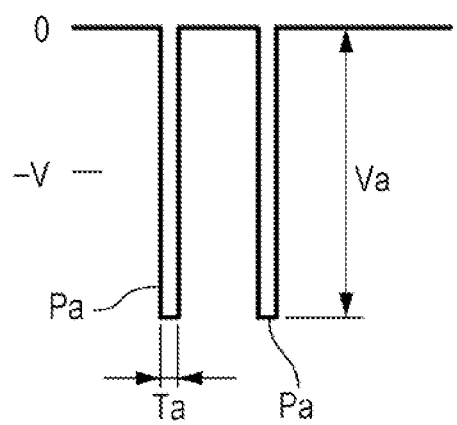
FIG. 10 is a diagram of polymer actuator driving control.

In a control example illustrated in FIG. 10, pulses Pa, each pulse Pa having a length of a short time Ta, of a reverse voltage "−Va" are applied across the first electrode layer 34 and the second electrode layer 35 in a period other than the drive period T2 of the actuators 32. The absolute value of the reverse voltage "−Va" is sufficiently greater than that of a rated voltage "+V" for driving the actuators 32. That is, the absolute value of the reverse voltage "−Va" is greater than or equal to 1.5 times or twice the absolute value of the rated voltage "+V". Also, the length Ta of each pulse Pa is less than 0.1 seconds.

Application of a high voltage in a direction opposite to that on the driving side rectifies the non-uniformity of distribution of ions and the non-uniformity of distribution of the ionic liquid in the actuators 32, thereby enhancing the advantage of preventing the ionic liquid from flowing non-uniformly to the second electrode layer 35 side and preventing the ionic liquid from seeping out from the plate surface 35a of the second electrode layer 35. By setting the time in which the reverse voltage "−Va" whose absolute value is greater than or equal to that of the rated voltage is applied to a short time that is less than 0.1 seconds, the acceleration of electrolysis due to a high voltage can be more easily prevented.

In a device such as a mobile device with a battery having a limited capacity, when the remaining battery capacity becomes low, it can be controlled not to perform one of the above-described processes of applying the reverse voltage, or to shorten the period of the process.

For example, in the control examples illustrated in FIGS. 7, 8, and 9, when the remaining battery capacity becomes low, the rectification period set immediately before the drive period T2 may be shortened, or control may be performed without setting the rectification period. Meanwhile, the drive period and the shortly-set rectification period are accumulated and stored. If the battery is replaced or an AC adapter is connected to the device and the current feeding capability of the power supply is restored, the rectification period may be set in accordance with the stored accumulated time of the drive period and the rectification period.

One of the above-described processes of applying the reverse voltage can be preferentially performed in a period in which the battery of the device is being charged since current can be sufficiently fed to the device. When the device is set to a charger or the like and it can be expected that the device will not be used, the rectification period in accordance with the accumulated drive period can be sufficiently ensured. In particular, in the control of intermittently applying the reverse voltage "–Va" whose absolute value is greater than that of the rated voltage, as illustrated in FIG. 10, or the control of intermittently applying the pulse voltage having a reverse potential, as illustrated in FIGS. 7 and 8, the amount of current instantly flowing between the first electrode layer 34 and the second electrode layer 35 is increased, and the current consumption amount is increased. Thus, the control illustrated in FIG. 10 or in FIG. 7 or 8 is preferably performed in a battery charging period or the like.

Figure 11:
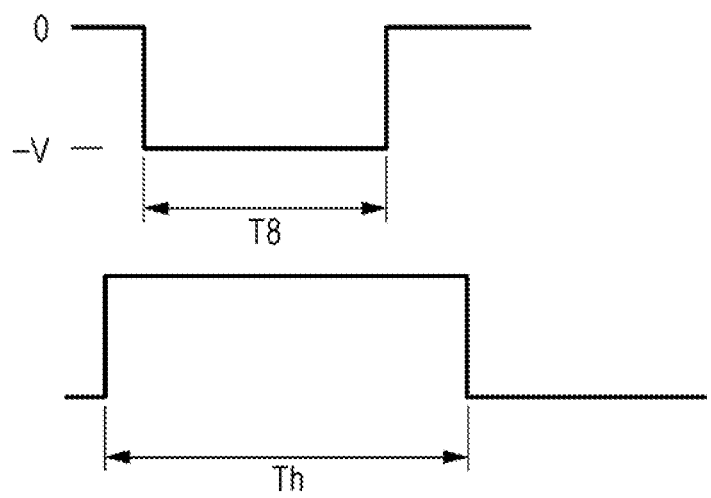
FIG. 11 is a diagram of polymer actuator driving control.

Alternately, a heater may be provided in each of the actuators 32. Referring to FIG. 11, an electricity feeding period Th for the heater may set at the time of a rectification period T8 in which the reverse voltage "–V" is applied to the actuators 32, and the actuators 32 may be heated. By performing a rectification operation while the actuators 32 are being heated, the tendency to bow and the non-uniformity of distribution of ions can be more easily rectified in a short time.

What is claimed is:

1. A drive device comprising:
   a polymer actuator formed of a polymer containing an ionic liquid, the polymer actuator including a first electrode layer provided on a first surface thereof and a second electrode layer provided on a second surface thereof, the polymer actuator having a fixed end, and
   a controller configured to control voltages applied across the first and second electrode layers,
   wherein the polymer actuator drives a drivable member during a drive period when a drive voltage is applied in a first direction across the first and second electrode layers by bending in a direction in which the first surface becomes concave, while a reverse voltage is applied in a second direction opposite to the first direction across the first and second electrode layers in a period other than the drive period.

2. The drive device according to claim 1, wherein the drivable member is a protruding member, and a free end of the polymer actuator causes the protruding member to protrude from a surface of a housing.

3. The drive device according to claim 1, wherein, when power is turned ON, the polymer actuator bends in a direction in which the second surface becomes concave during a rectification period in which the reverse voltage is applied across the first and second electrode layers.

4. The drive device according to claim 3, wherein the polymer actuator is being heated during the rectification period.

5. The drive device according to claim 1, wherein, after an operation of the drivable member is completed, the polymer actuator bends in a direction in which the second surface becomes concave during a rectification period in which the reverse voltage is applied across the first and second electrode layers.

6. The drive device according to claim 5, wherein the rectification period is set in accordance with a length of the drive period.

7. The drive device according to claim 6, wherein the rectification period is set in accordance with an accumulated time of the drive period.

8. The drive device according to claim 1, wherein the controller applies the reverse voltage having an absolute value greater than or equal to that of a rated voltage for a short time period in a period other than the drive period.

9. The drive device according to claim 1, wherein the controller changes a time period in which the reverse voltage is applied in accordance with current feeding capability of a power supply provided in the drive device.

10. The drive device according to claim 1, wherein the controller applies the reverse voltage when the drive device is being charged.

11. The drive device according to claim 1, wherein the controller provides a rectification period in which the reverse voltage is applied such that the polymer actuator bends in a direction in which the second surface becomes concave.

12. The drive device according to claim 11, wherein the controller continuously applies the reverse voltage with a certain magnitude during the rectification period.

13. The drive device according to claim 11, wherein the controller intermittently applies the reverse voltage with a certain magnitude during the rectification period.

14. The drive device according to claim 11, wherein the controller changes a magnitude of the reverse voltage during the rectification period.

15. The drive device according to claim 11, wherein the controller temporarily applies a voltage in a same direction as that of the drive voltage in addition to applying the reverse voltage during the rectification period.

16. The drive device according to claim 11, wherein the rectification period is provided at least one of: when power is turned ON; or when an operation of the drivable member is completed.

17. The drive device according to claim 11, wherein the polymer actuator is being heated during the rectification period.

18. The drive device according to claim 11, wherein the controller sets the rectification period in accordance with a length of the drive period.

19. The drive device according to claim 18, wherein the controller sets the rectification period in accordance with an accumulated time of the drive period.

* * * * *